US011856602B2

(12) United States Patent
Changlani et al.

(10) Patent No.: US 11,856,602 B2
(45) Date of Patent: Dec. 26, 2023

(54) SYSTEMS AND METHODS FOR OPTIMIZING RATE SELECTION FOR TRANSMISSIONS DURING SPATIAL REUSE IN WLAN NETWORKS

(71) Applicant: HEWLETT PACKARD ENTERPRISE DEVELOPMENT LP, Houston, TX (US)

(72) Inventors: Nitin A. Changlani, Santa Clara, CA (US); Eldad Perahia, Park City, UT (US); Gaurav Patwardhan, Santa Clara, CA (US); Abhiruchi Dakshinkar, Santa Clara, CA (US); Sachin Ganu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 221 days.

(21) Appl. No.: 17/351,843

(22) Filed: Jun. 18, 2021

(65) Prior Publication Data
US 2022/0408480 A1  Dec. 22, 2022

(51) Int. Cl.
*H04W 74/08* (2009.01)
*H04L 1/00* (2006.01)
*H04W 84/12* (2009.01)

(52) U.S. Cl.
CPC ....... *H04W 74/0808* (2013.01); *H04L 1/0003* (2013.01); *H04L 1/0071* (2013.01); *H04W 84/12* (2013.01)

(58) Field of Classification Search
CPC .............. H04W 74/0808; H04W 84/12; H04L 1/0003; H04L 1/0071; H04L 1/1829
USPC ...................................... 370/329
See application file for complete search history.

(56) References Cited

U.S. PATENT DOCUMENTS

| 8,254,501 | B2 | 8/2012 | Suga et al. | |
|---|---|---|---|---|
| 9,538,535 | B2 | 1/2017 | Huang et al. | |
| 11,212,750 | B1 * | 12/2021 | Ali | H04W 52/18 |
| 2016/0302128 | A1 * | 10/2016 | Anchan | H04W 36/0022 |
| 2016/0330099 | A1 | 11/2016 | Koo et al. | |

(Continued)

FOREIGN PATENT DOCUMENTS

CN  103916943  7/2014

OTHER PUBLICATIONS

Sammour, I. et al., Evaluation of Rate Adaptation Algorithms in IEEE 802.11 Networks (Research Paper), Electronics, Sep. 3, 2020, 16 pgs., vol. 9, Issue 1436, IEEE.

*Primary Examiner* — Kwang B Yao
*Assistant Examiner* — Syed M Bokhari
(74) *Attorney, Agent, or Firm* — Sheppard Mullin Richter & Hampton LLP

(57) ABSTRACT

Systems and methods are provided for using a short data frame sent at a particular rate that can be used to probe a channel on which an access point is operating. The rate can be increased/decreased depending on whether or not transmission of the short data frame was successful or not. In this way, the highest possible rate (which can be impacted by any or all of the following factors: number of spatial streams, modulation and coding scheme, channel bandwidth, guard interval) can be selected to transmit data on the channel. In other words, a transmission rate can be selected dynamically and on a per-packet basis for a spatial reuse data frame that would follow the short data frame based on whether transmission of the short data frame was successful.

15 Claims, 7 Drawing Sheets

(56) References Cited

U.S. PATENT DOCUMENTS

2020/0187011 A1\* 6/2020 Malichenko .......... H04W 16/10
2021/0075566 A1\* 3/2021 Guo ...................... H04W 72/21

\* cited by examiner

SYSTEMS AND METHODS FOR OPTIMIZING RATE SELECTION FOR TRANSMISSIONS DURING SPATIAL REUSE IN WLAN NETWORKS

DESCRIPTION OF RELATED ART

The widespread proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing Spatial Reuse (SR) and Basic Service Sets (BSS) Color schemes in IEEE 802.11ax and IEEE 802.11ah implementations, respectively. These schemes are intended to improve network throughput and spectrum efficiency in dense environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
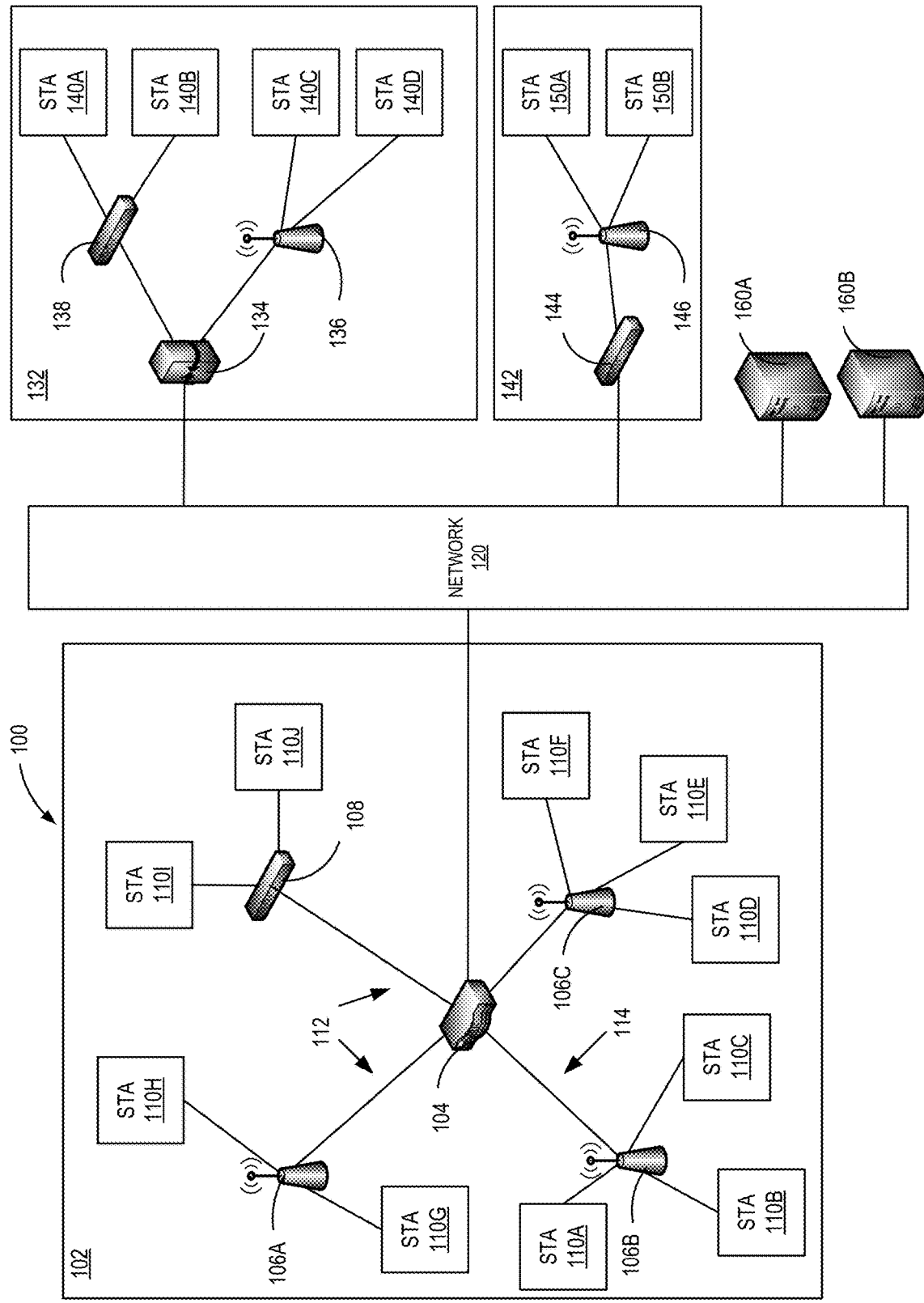
FIG. 1 illustrates an example wireless network deployment in accordance with various embodiments.

The figures are not exhaustive and do not limit the present disclosure to the precise form disclosed.

DETAILED DESCRIPTION

As noted above, certain schemes are intended to improve network throughput and spectrum efficiency in dense environments, one being frequency or spatial reuse (SR). This SR feature allows two or more devices existing in different, adjoining basic service sets (BSSs) in the same frequency channel to transmit simultaneously if certain conditions are met. These conditions are described by using different CCA (Clear Channel Assessment) levels for inter-BSS and intra-BSS frames on the same channel. The distinction between inter and intra-BSS frames is given by the color parameter embedded in a packet transmitted in the respective BSS. Depending on the CCA thresholds for inter-BSS vs intra-BSS frames, one access point (AP) or device may defer medium access to the other AP or device depending on the BSS where the packet originated.

In particular, the introduction of SR was intended to enhance system level throughput by allowing traffic from one BSS to overlap in time and frequency with another BSS (Overlapping BSS (OBSS)) by, in essence, reducing the time to access the channel medium. One of the methods to accomplish this is OBSS Packet-Detect (OBSS_PD). OBSS_PD-based SR is achieved by manipulating the preamble detect thresholds and transmit power, e.g., Effective Isotropic Radiated Power (EIRP) of APs and non-AP stations (STAB) in the entire BSS. SR relies on the fact that if there is high Signal-to-Noise Ratio (SNR)/Signal-to-interference-plus-noise ratio (SINR) between two entities at a given EIRP, the receiver can withstand some interference caused by a simultaneous transmission in the vicinity, and can receive and decode packets simultaneously. This also involves not causing interference in return, and that is achieved by changing EIRP dynamically.

BSS color may be used to differentiate between intra-BSS frames and Overlapping BSS (OBSS) frames, and to determine which CCA threshold to use while accessing the shared channel resource in the same frequency range. A radio can detect that its BSS color collides with the BSS color used by its neighboring radios from a BSS color collision report from its associated stations (STAB) or by receiving frames from an OBSS STA containing the same BSS color. If the collision persists too long (for example, the specified dot11BSSColorCollisionAPPeriod minimum value is 50 seconds), it stops using that BSS color or it switches to a different BSS color as specified by the IEEE 802.11ax standard.

As will be described in greater detail below, rate adaptation was used to make transmissions more robust at a given SINR prior to the introduction of SR, while after the introduction of SR, any reduction in SINR can be quite transient, and exist only as long as the OBSS transmission is in progress. Hence, traditional rate adaptation (that may work heuristically on a longer timeline/maintain a longer history of performance) may not be sufficiently responsive to mitigate the reduction in SINR when SR is in effect. During SR, the transmitter in a BSS does have knowledge of the OBSS transmission, and that there will be interference on the link medium. However, the modulation and coding scheme (MCS) to be used should be based on the SINR calculation at the receiver end. This is because the interference from OBSS transmissions may be different at the receiver, resulting in a potentially new rate adaptation mechanism while SR is in effect.

Accordingly, embodiments of the present disclosure are directed to the use of a short data frame sent at a particular rate that can be used to probe a channel on which an AP is operating. The rate can be increased/decreased depending on whether or not transmission of the short data frame was successful or not. In this way, the highest possible rate (which can be impacted by any or all of the following factors: number of spatial streams, MCS, channel bandwidth, guard interval) can be selected to transmit data. In other words, rate can be selected dynamically and on a per-packet basis for an SR data frame that would follow the short data frame based on whether transmission of the short data frame was successful.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices/STAs 110A-J. Using a connection to a switch 108 or AP 106A-C, a STA 110A-J may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110I-J. STAs 110I-J may connect to the switch 108 and through the switch 108, may be able to access other devices within the network configuration 100. STAs 110I-J may also be able to access the network 120, through the switch 108. The STAs 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for STAs 110A-H. Each of APs 106A-C may be a combination of hardware, software, and/or firmware that is configured to provide wireless network connectivity to wireless STAs 110A-H. In the illustrated example, APs 106A-C can be managed and configured by the controller 104. APs 106A-C communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

Figure 2:
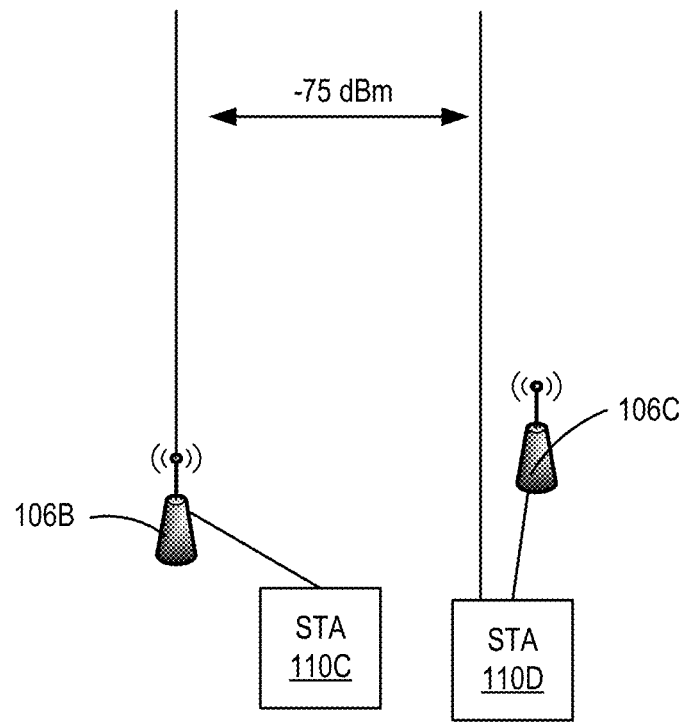
FIG. 2 illustrates an example of an overlapping basic service set (OBSS) scenario in which optimized transmission rate adaptation can be performed in accordance with various embodiments.

FIG. 2 illustrates an example of intra-BSS communication that may cause inter-BSS/OBSS interference in the context of the example network 100 (FIG. 1). In the example of FIG. 2, STA 110C (associated to AP 106B) may be transmitting data on a particular channel, e.g., channel 36, while STA 110D (associated to AP 106C) may also be operating on channel 36. Because STAs 110C and 110D are geographically close/near one another, they may be able to hear (detect) each other's transmissions above the Preamble Detect (PD) threshold. Because STAs' 110C/110D respective PD thresholds are being triggered by each other's energy, STAs 110C/110D are in contention with each other. Accordingly, STAs 110C/110D will take turns accessing channel 36, with each STA getting approximately half the available bandwidth (and throughput) of channel 36, but they will not necessarily interfere with each other. That is, STA 110C's energy is not considered to be interference by AP 106C as it is too far away, while STA 110D's energy is not powerful enough to be heard by AP 106B, but STAs 110C/110D are close enough to interfere, and so are prevented by the CCA function from transmitting simultaneously on channel 36. It should be understood that the above is only an example, and that inter-BSS/OBSS interference can occur between, e.g., two APs, or between an AP and a STA.

However, with SR, STAs 110C/110D can coordinate with one another and can be allowed to transmit data at the same time with a high likelihood of success because AP 106B cannot hear STA 110D, and AP 106C cannot hear STA 110C. Thus, neither of APs 106B/106C experiences interference from another's communications. The coordination comes about from the recognition (on a packet-by-packet basis) where a packet belongs to one BSS/BSSID or another BSS/BSSID. This determination can be accomplished using the aforementioned BSS coloring. It should be understood that the "color" is an index number, e.g., from 1 to 63, assigned to individual APs along with channel assignment, whether manually, through self-automated determination, or via external automated determination and assignment. When APs share the same channel and are in the same vicinity, they should have different BSS colors. When two BSSs operating in the same vicinity and on the same channel have the same BSS color, a condition referred to as color collision occurs, and can be detected by a client device. The client device may then alert the AP to which it is associated, prompting the AP to announce a BSS color change (via beaconing).

Figure 3:
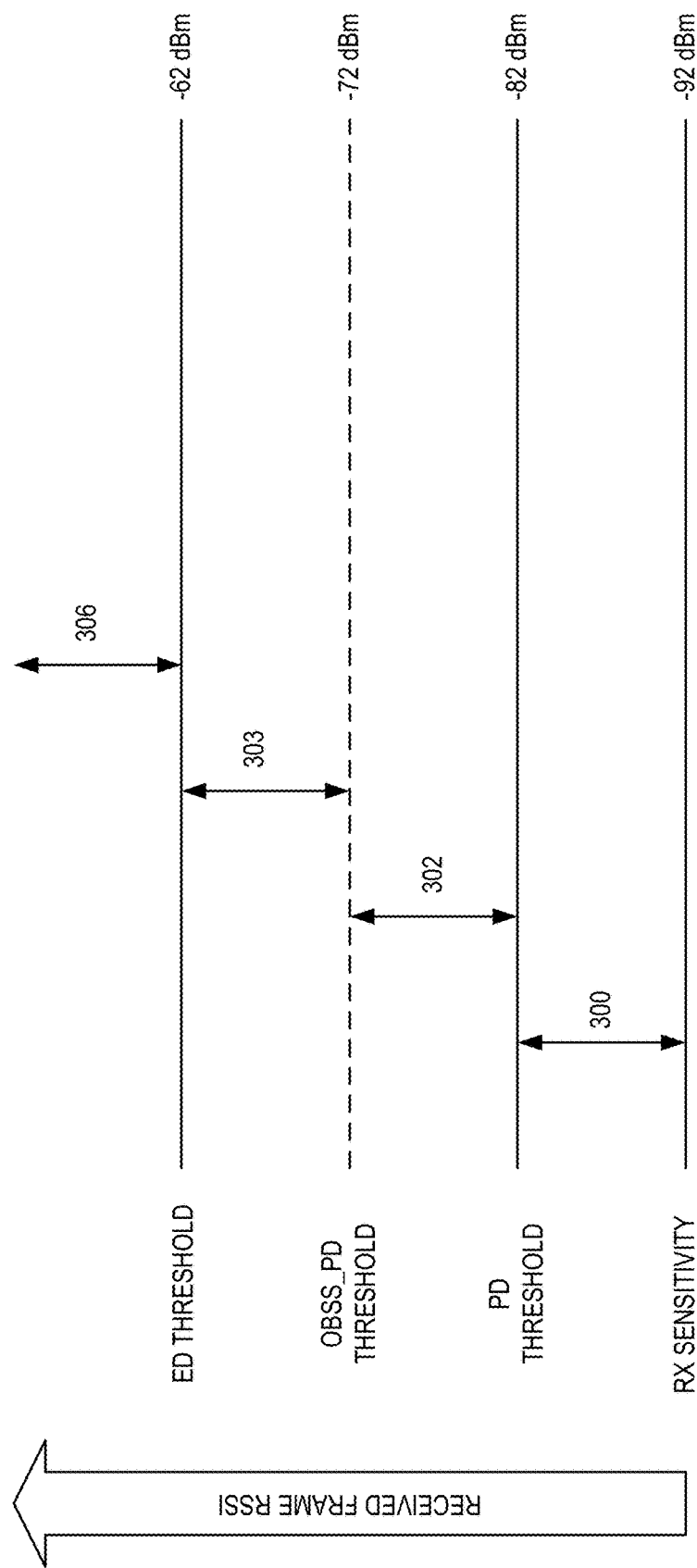
FIG. 3 illustrates example energy thresholds for determining whether or not spatial reuse can be leveraged.

FIG. 3 illustrates example received frame Received Signal Strength Identifier (RSSI), the estimated measure of power level that, e.g., a STA, is receiving from an AP, and RSSI-based thresholds that work in conjunction to allow for the use of SR. In this example, the threshold values are as follows: ED threshold of −62 dBm; OBSS_PD threshold of −72 dBm; PD threshold of −82 dBm; and Rx sensitivity threshold of −92 dBm. It should be understood that the Rx sensitivity threshold refers to a signal strength/power below which, a device is typically unable to detect a WLAN signal. In particular, when a detected signal power is above the Rx sensitivity threshold but below the PD threshold (signified by arrow 300), the transmitter (of an AP or STA) may proceed with transmitting data. In other words, if the received frame RSSI does not reach the PD threshold, the CCA is set/considered to be idle irrespective of whether the detected energy is a WLAN preamble or not.

Between the PD threshold and the OBSS_PD threshold (signified by arrow 302), if the detected energy is a WLAN preamble from the same BSS as the AP that detected the WLAN preamble, the CCA is considered busy, in which case SR is not used. However, if the detected energy is a WLAN preamble from a different OBSS (or from any other source), SR can be performed, thereby allowing traffic from two OBSSs to be transmitted simultaneously. Between the ED threshold and the OBSS_PD threshold (signified by arrow 304), the CCA is considered busy if the energy detected by the AP is a WLAN preamble from the same or another OBSS. On the other hand, if the detected energy is from any other source, the CCA is considered idle, and transmissions can proceed on the link. Above the ED threshold (signified by arrow 306), the CCA is considered to be busy irrespective of whether the detected energy is a WLAN preamble or not. The AP cannot/should not transmit when the CCA is busy. Again, the use of SR provides a way for transmissions to occur within a BSS while there are simultaneously occurring transmissions in an OBSS, where SR relies on differentiating the transmissions from a given BSS and an OBSS by assigning a different color to each BSS. In this way, the detection threshold for the RSSI in accordance with a CCA is different for a given BSS than all other OBSSs.

As noted above, in a scenario where an AP detects WLAN energy (received frame RSSI) that falls between the OBSS_PD and PD thresholds (arrow 302), a transmitter in a given BSS can transmit its frame while there is a WLAN frame being transmitted on an OBSS. Although this allows for effective SR, such a transmission would experience higher interference due to the simultaneously occurring OBSS transmission. Higher levels of interference can also be a result of the SINR, where the SINR is less than would be the case where there are no OBSS transmissions.

In traditional deployments where SR was yet not introduced, such conditions could occur where a channel may have had higher noise or interference, and it could persist for a certain amount of time. This noise/interference could be mitigated by adapting the transmission parameters so that at a given level of SINR, the transmission can be made more robust. The parameters included the MCS, the number of spatial streams (NSS), and the bandwidth (BW), along with other parameters, e.g., transmit (TX) power. Such parameters could be changed in the following manner: (1) by reducing the MCS, a more conservative modulation and coding rate is allowed, thereby improving robustness (reduce errors), but at the cost of reduced physical rate; (2) by reducing the NSS, the receive (RX) diversity on the receiver could be improved, but would also mean reducing the effective data rate since not all spatial streams will be used; (3) by reducing the BW, power spectral density can be improved, and hence the numerator in the SINR calculation (which also comes at the cost of reduced physical rate).

As noted above, with SR, the reduction in SINR can be transient and exist only as long as the OBSS transmission is in progress, and again, the traditional rate adaptation that may work heuristically on a longer timeline and maintain a longer history of performance may not be sufficiently responsive to mitigate the reduced SINR when SR is in effect. As explained above, a new rate adaptation mechanism is disclosed, where this rate adaptation can be modified specifically for use when SR is in effect. Such rate adaptation mechanisms provide robustness to transmissions during SR, i.e., transmissions that occur with simultaneously occurring OBSS transmissions. In particular, and in accordance with some embodiments, rate adaptation can be made aggressive. That is, transmission parameters can be adapted aggressively in the event an OBSS transmission occurs. Moreover, the transmission parameters can operate in accordance with shorter time durations, on the order of an OBSS TX opportunity (TXOP), for example. It should be noted that the disclosed rate adaptation mechanisms/algorithms can be used in parallel with traditional rate adaptation, such that the disclosed rate adaptation is used only when SR is in effect/being used, while the traditional rate adaptation can be used/followed when SR is not in effect/not being used.

Generally, rate adaptation involves estimating channel conditions using metrics like frame error rate and sub-frame error rate that are measured over past transmissions in order to derive the transmission rate parameters described earlier (MCS, NSS, BW). It should be noted that frame error refers to an instance where the entire physical protocol data unit (PPDU) is lost. In contrast, sub-frame error can refer to instances where only certain MAC protocol data units (MPDUs) within the PPDU are lost. These metrics can be used with a rate adaptation algorithm to estimate noise as well as interference in the channel and act accordingly. Transmission rate can be thought of as an actual, raw bit rate (Mbps) over a medium as a function of the MCS, NSS and BW transmission rate parameters.

It should be understood that the 802.11 physical layer is divided into two sublayers, the PLCP and Physical Medium Dependent (PMD) sublayers. The PLCP sublayer prepares a frame for transmission by taking a frame from the MAC sublayer, and creating a PPDU. The PMD sublayer than modulates and transmits the data as bits. In particular, when the MPDU is handed down to the physical layer, it is referred to as a PSDU. When the PLCP receives the PSDU, it prepares the PSDU for transmission by creating a PPDU (by adding a preamble and PHY header to the PSDU).

Since SR may occur only for certain frames, there may be a lack of reliable history to model the interference from an OBSS. Moreover, the level of interference may change depending on which OBSS (a BSS may have multiple OBSSs) is performing the simultaneous transmission. Also, the transmission rate may be aggressively determined because the transmission rate parameters that have been selected are to be used immediately while SR is in effect. Once an OBSS transmission terminates, this transmission rate may no longer be of use since traditional rate adaptation techniques can be used once the OBSS transmission terminates. It should be understood that as is the case with traditional rate adaptation algorithms, the end objective is to optimize the rate parameters for transmission. A lower rate would provide more robustness at the cost of reduced physical data rate (longer airtime), whereas a higher rate would be the opposite, i.e., providing less robustness, but with the advantage of taking up less airtime/greater throughput. In short, the objective of any rate adaptation algorithm/technique is to estimate, with limited penalty for failure, the highest transmission rate parameters that provide sufficient robustness, i.e., maximize the goodput (the amount/number of useful information bits delivered to a certain destination per unit of time, or put another way, a measure of physical rate and the errors due to the level of robustness chosen).

Thus, and as alluded to above, various embodiments involve sending a short data frame that precedes a frame to be transmitted while SR is in effect. The purpose of the short data frame is to aid in estimating the proper transmission rate to use for a SR data frame that is to follow. In some embodiments, the short data frame is a data PPDU with limited length. For example, the short data frame may have zero data length, or contain enough data for just one symbol, or as an alternative, may extend only up to one MAC service data unit (MSDU). It should be understood that at least one MSDU along with the MAC header can be referred to as an MPDU, or entire 802.11 frame that includes the MAC header, body, and trailer. Instead of simply transmitting a SR data frame during SR, the short data frame (basically an 802.11 data frame as alluded to above) is transmitted first. This low-cost frame (since the payload length is small, the frame will utilize very less airtime) will act as a probe to identify whether the transmission rate parameters that were used for the short data frame were sufficiently good for a successful transmission. If the parameters were too aggressive, the short data frame would remain unacknowledged, but the cost of failure is limited/mitigated due again to the small payload length. However, if transmission of the short data frame is successful (it is successfully received and acknowledged), transmission of the actual SR data frame using the same transmission rate parameters as were used for transmitting the short data frame. It should be understood that aggressive parameters in this context can refer to, e.g., parameters reflecting high/higher bandwidth, high/higher number of spatial streams, or a high/higher selected MCS index. That is, aggressive parameters can refer to parameters that are closer to/equal to a rate that would have been selected using a traditional rate control algorithm during periods of non-SR transmissions.

For increasing the probability of the short data frame to be successful, the rate used can be between the lowest possible rate and the highest rate estimate provided by a traditional rate adaptation algorithm outside of SR. Since lower rates provide more robustness, but at the cost of reduced physical rate, while higher rates provide less robustness but at the benefit of increased physical rate, the choice of the rate for the short data frame becomes a function of the effective goodput. In the event there is a lack of such knowledge about the goodput for different rates, an implementation-based choice to start with can be selected, for example, transmission rate parameters that lie approximately midway between the extreme (minimum/maximum) options.

Figure 4A:
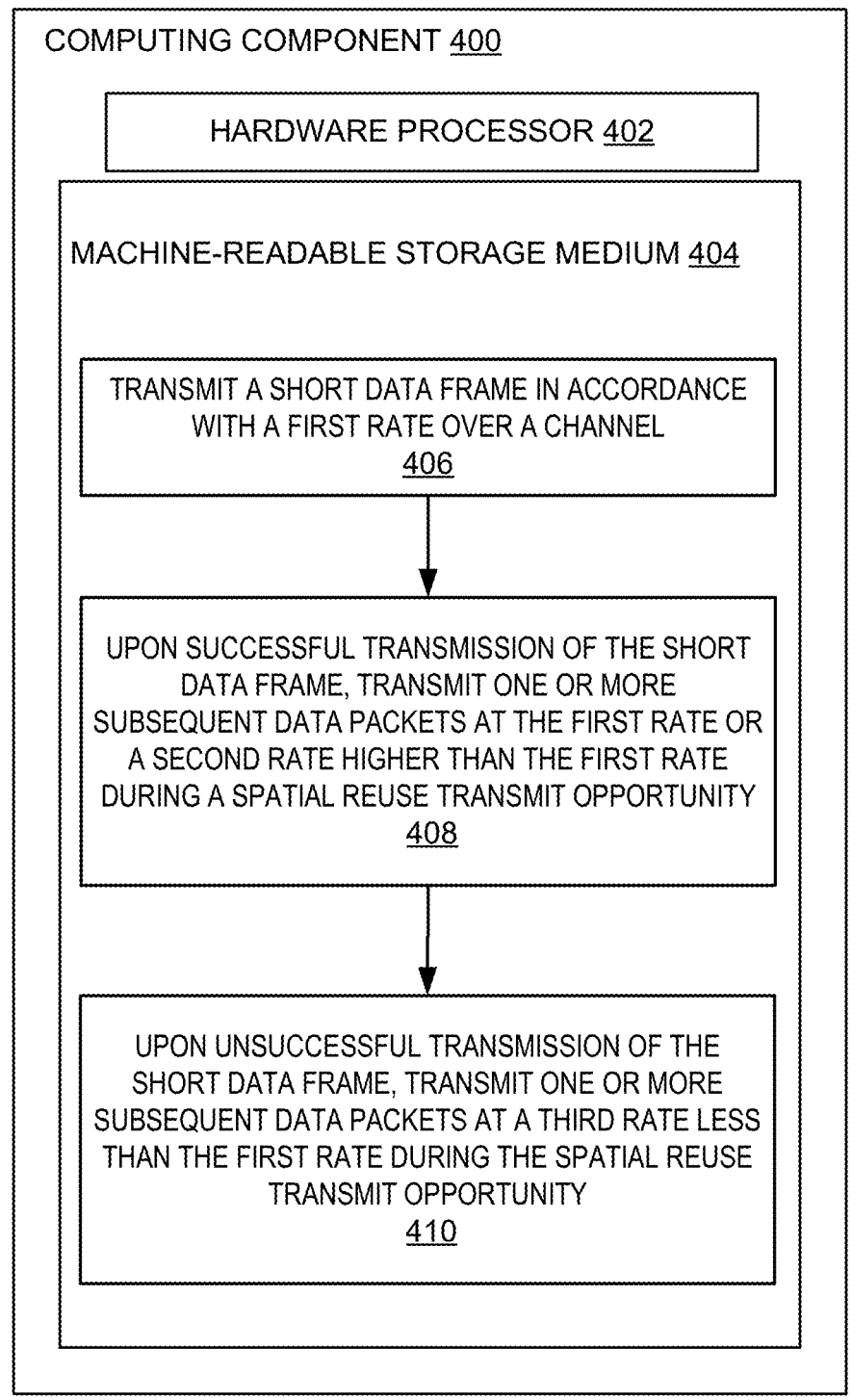
FIG. 4A illustrates an example computing component for effectuating optimized transmission rate selection and adaptation in accordance with one embodiment.

FIG. 4A is a block diagram of an example computing component or device 400 for transmission rate adaptation during the use of SR/while SR is in effect. In accordance with one embodiment, computing component 400 may be, for example, a server computer, a controller, or any other similar computing component capable of processing data. In the example implementation of FIG. 4A, computing component 400 includes a hardware processor, 402, and machine-readable storage medium, 404. In some embodiments, computing component 400 may be an embodiment of a controller, e.g., a controller such as controller 104 (FIG. 1A), or another component of wireless network 100, e.g., an AP such as AP 106A (FIG. 1A), for example. In some embodiments, computing component 400 may be an embodiment of a controller of a STA. Accordingly, transmission rate adaptation in accordance with various embodiments can apply to both downlink and uplink traffic Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-410, to control processes or operations for an AP or STA. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-410.

As noted above, hardware processor 402 may control processes/operations for an AP or STA. Hardware processor 402 may execute instruction 406 to transmit a short data frame in accordance with a first rate over a channel. It should be understood that the transmission rate associated with the short data frame, as discussed above, can be some rate between the highest/lowest transmission rate estimates from a traditional rate adaptation algorithm without considering SR. The initial or default rate can vary. In other embodiments, as also described above, selection of a transmission rate for the short data frame can be based on an approximately midpoint/midrange transmission rate parameters values between respective minima/maxima of the transmission rate parameter values, i.e., values that are not overly aggressive or overly conservative/defensive. Selection/use of a transmission rate higher than midway transmission rate, but lower than that determined by a traditional rate control algorithm may depend, at least in part, on an application's specific requirements for required goodput. For example, an application whose traffic flow is delivered during a SR transmit opportunity may have some minimum bit rate requirements which could be used to place a lower bound on the selected transmission rate to be used during SR.

Hardware processor 402 may execute instruction 408 to, upon successful transmission of the short data frame, transmitting one or more subsequent data packets at the first rate or a second rate higher than the first rate during a SR transmit opportunity.

Figure 4B:
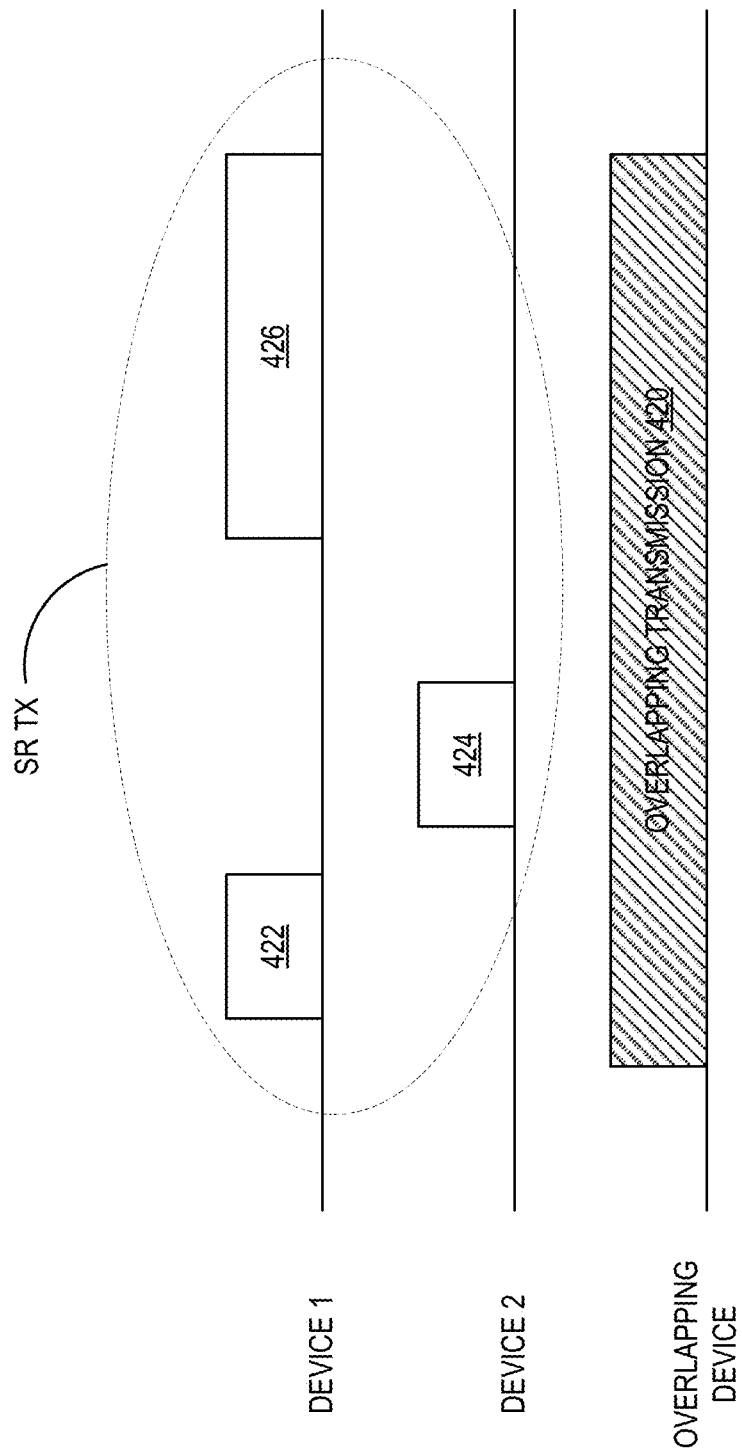
FIG. 4B illustrates an example of short data frame transmission and spatial reuse data transmission in accordance with one embodiment.

Referring now to FIG. 4B, an overlapping, e.g., OBSS, transmission 420 is in progress, i.e., some neighboring overlapping, e.g., OBSS, device (AP or STA) is transmitting data packets/frames, which may be allowed when SR is in effect (made possible when the detected energy of the overlapping transmission 420 is between the PD and OBSS_PD thresholds). Successful short data frame transmission is determined by receipt of an acknowledgement (ACK) from the receiver/destination device. In the example of FIG. 4B, device 1 sends the short data frame 422. If device 2 receives the short data frame, it can send a corresponding ACK 424 back to device 1.

Upon successful transmission of the short data frame 422, the following operations can be performed. The SR data frame(s) that follow the short data frame 422 during the SR period (in this example, embodied by data TX OP 426) can be scheduled within a Short Interframe Spacing (SIFS) duration or a longer duration after the short data frame. It should be understood that the transmit opportunity (TX OP 426) refers to the period during which an AP or STA has the right to transmit data on the medium after sensing the medium is idle. Actual transmission of data during that TX OP may be subject to minimum backoffs. It should also be understood that SIFS typically refers to an amount of time (e.g., ms), required for a wireless interface of a device, e.g., AP, to process a received frame, and to respond with some type/form of response frame. The SR data frames can include one or more PPDUs that may again be separated by just a SIFS duration or a longer duration. The PPDUs may be directed towards different devices in the BSS.

If the short data frame transmission was successful, the estimated success of the transmission rate parameters that were used for the short data frame can be used for the SR data transmissions as well. Depending on the degree of importance a particular implementation gives to robustness versus the physical rate, the SR data transmissions can also be transmitted at a higher transmission rate than the transmission rate at which the short data frame was transmitted. In some embodiments, it is even possible to have a gradual or stepwise increasing order of transmission rate parameter values for the frames of the SR data transmissions. For example, if the short data frame used MCS 2, then the following SR data frame(s) could all use MCS 2, or the following SR data frames could all use MCS 3. Alternatively still, it could be such that the first (or the first few SR data frames) use MCS 2 and the next (or next few) SR data frames use MCS 3 and so forth.

In some embodiments, as an alternative, a probing mechanism can be employed by interleaving the SR data transmissions with short data frames that use a higher transmission rate than the one used before. If transmission of the interleaved short data frames is successful—that is, and again, the short data frame is acknowledged—then the subsequent/ensuing data frames in that SR transmission can continue to use the higher transmission rate parameter values. For example, if the short data frame used MCS 2, then the following data frame(s) may all use MCS 2. Thereafter, another short data frame is transmitted with MCS 3, and if receipt of the short data frame (at MCS 3) is successful, the following SR data frame(s) could graduate to using MCS 3 as well. Since the subsequent probes are building on the success of previous short data frames, the length of the data carried by the SR data frames can be increased without incurring increased airtime cost (recalling that higher transmission rates translate to higher throughput/reduced airtime). If the short data frame fails (receipt is not acknowledged), the following SR data frames can continue to use/be transmitted at MCS 2.

Figure 4C:
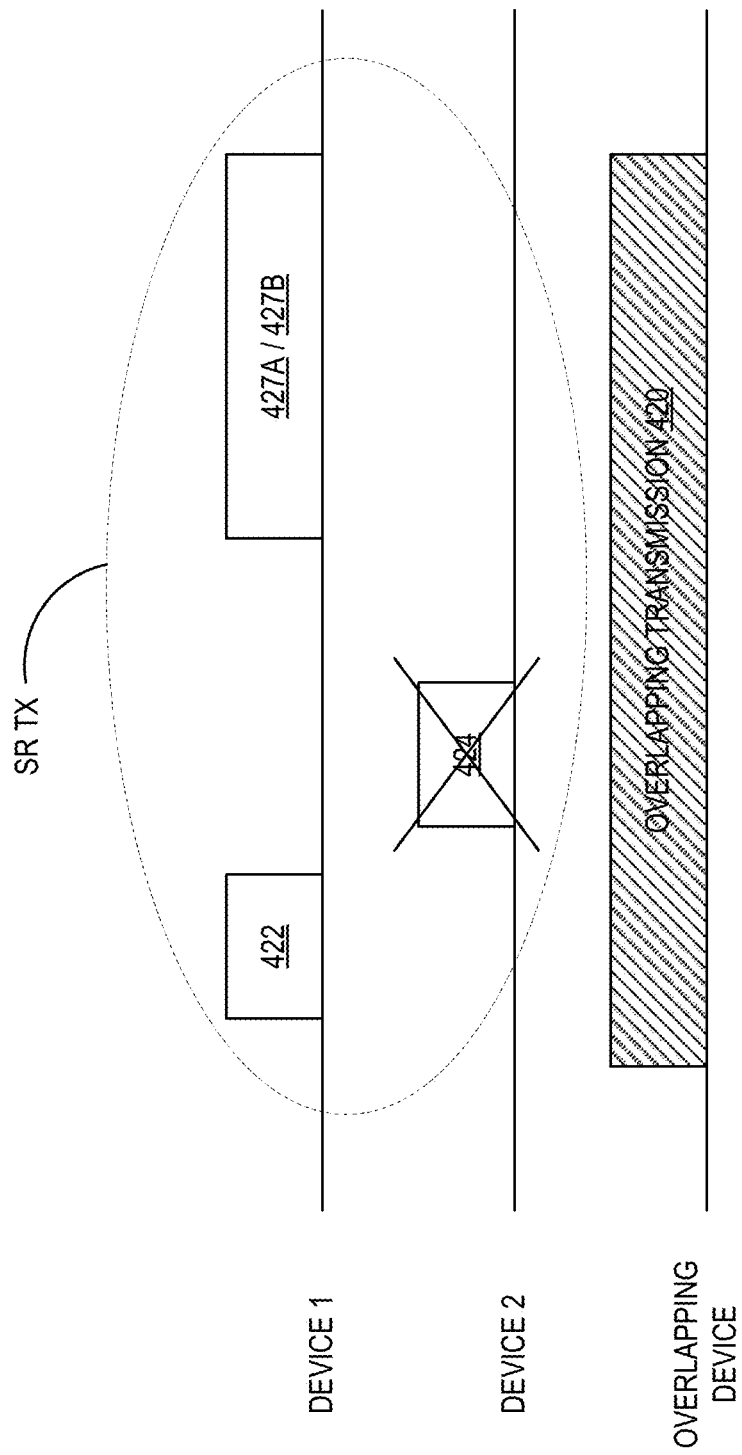
FIG. 4C illustrates an example of short data frame transmission and spatial reuse data transmission/short data frame retransmission in accordance with one embodiment.

Returning to FIG. 4A, which will be discussed in conjunction with FIGS. 4B and 4C, hardware processor 402 may execute instruction 410 to, upon unsuccessful transmission of the short data frame, transmit one or more subsequent data packets at a third rate less than the first rate during the spatial reuse transmission opportunity. That is, and if the short data frame 422 transmitted during SR is unsuccessful (meaning short data frame 422 goes unacknowledged), a new ceiling for the set of possible transmission rate parameters that can be used for SR may be determined for the transmission of SR data frames. Again, the purpose of transmitting the short data frame prior to a SR transmit opportunity is to gauge whether or not the transmission rate associated with the short data frame results in successful transmission, pursuant to which following data frames can be sent at, e.g., the same transmission rate. In this way, successful transmission of the actual data packets can be ensured or, at the least, made more likely. If the short data frame is not transmitted successfully, the transmission rate can be backed down.

In accordance with one embodiment, transmission of a new short data frame 427A can be attempted using a lower transmission rate parameter values set (with the new ceiling value). If the new short data frame 427A is successfully transmitted/received, operation can proceed in accordance with the above-described mechanisms/options after successful short data frame transmission.

That is, following successful transmission of a short data frame 422, SR data frame(s) that follow the short data frame 422 during the SR period (in this example, embodied by data transmission opportunity (e.g., TX OP) 427B) can be scheduled within a SIFS duration or a longer duration after the short data frame 422. The SR data frames can include one or more PPDUs that may again be separated by just a SIFS duration or a longer duration. The PPDUs may be directed towards different devices. Depending on the degree of importance a particular implementation gives to robustness versus the physical rate, the SR data transmissions can also be transmitted at a higher transmission rate than the transmission rate at which the short data frame 422 was transmitted.

Again, it is possible to have a gradual or stepwise increasing order of transmission rate parameter values for the frames of the SR data transmissions. In some embodiments, as an alternative, a probing mechanism can be employed by interleaving the SR data transmissions with short data frames that use a higher rate than the one used before. If transmission of the interleaved short data frames is successful, the subsequent/ensuing data frames in that SR transmission can continue to use the higher frame.

If the operations are focused on maximizing the use of the SR duration for attempting actual data transmission, lower values for the transmission rate parameter set can be used, and the data frame(s) can be transmitted directly, i.e., without any intervening short data frame(s) with this new transmission rate, and eventually probe higher transmission rates as described above.

In the above-described embodiments/use case scenarios, the choice of transmission rate for short data frames, as well as actual SR data frames, may be the optimal value between physical rate (airtime usage) and robustness. For subsequent SR opportunities, there may be a new rate used by the traditional rate adaptation algorithm outside of SR opportunities. The transmission rate used in the prior SR opportunity can be leveraged based on the following: (1) if the transmission rate was used within some "reasonable" threshold of recency; (2) the OBSS color is same as that associated with data transmissions occurring during the previous SR opportunity; and (3) the new SR opportunity is to be used for the same STA(s) as were involved in the previous SR opportunity. The new transmission rate parameter values can be within the range of the previous successful transmission rate parameter values during the previous SR opportunity, and the transmission rate used by the traditional, parallel rate adaptation algorithm used outside the SR period.

On the other hand, if the BSS device/transmitter cannot converge on a successful transmission rate to be used, a new transmission rate can instead be determined, that new transmission rate falling between the lowest possible transmission rate and the lower of the last unsuccessful transmission rate in the last SR opportunity or the last estimate of the highest transmission rate by the traditional rate adaptation algorithm outside the SR period. If the previous SR opportunity is too old for its decisions to be considered as valid, the algorithm can start afresh. It should be understood that the algorithm can specify or adhere to a time threshold associated with the previous SR opportunity because over time, channel conditions may have changed, possibly making the transmission rate in the last SR opportunity inapplicable or irrelevant/invalid.

The selection of transmission rate parameter values (whether to increase or decrease the transmission rate) can be performed to reflect a preference given to robustness or airtime utilization. For example, an optimal selection of transmission rate parameter values could be based on a preference for a linear increment and multiplicative decrement of the selected transmission rate in order to be ensure a higher degree of successful SR transmissions (which could be at the cost of airtime).

Consider the following example, where an AP transmits to a 1SS (NSS with N=1), 20 MHz 802.11ax-capable STA with MCS 10 when SR is not in effect. The lowest possible transmission rate in this case is MCS 0 (ignoring legacy rates). As discussed above, transmission rate can be a function of NSS, BW, and MCS, where in this example, N=1 and 20 MHz reflects the lowest possible values for NSS and BW, leaving MCS to be a deciding/driving parameter. During SR, the AP may attempt transmissions to this STA using MCS 6 first. In the event that the transmission succeeds, the transmission rate can eventually increase to MCS 7, then MCS 8 and possibly even MCS 9, using mechanisms discussed above.

However, in the event that the transmission fails, in the interests of salvaging the use of the SR opportunity, the AP could drop down directly to MCS 3 to ensure robustness. The process can then repeat with MCS 3 as the starting point. It should be noted that while the assumption is made that the devices performing SR are a part of a BSS, the problems and the solutions disclosed herein can be similarly be applied even f the devices were not part of a BSS—for example, a P2P link—but were still doing SR. The topology of the network is in the purview of the 802.11 standard, but the solutions apply irrespective of the 802.11 standard.

Figure 5:
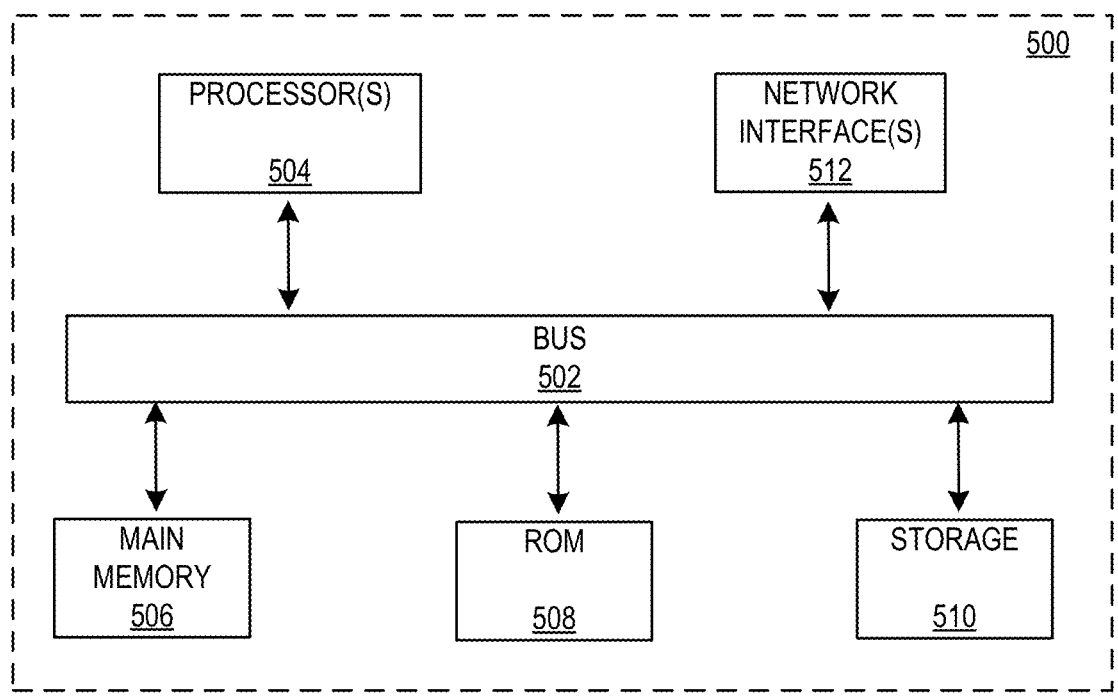
FIG. 5 illustrates an example computing component in which various embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may further include at least one network interface 512, such as a network interface controller (NIC), network adapter, or the like, or a combination thereof, coupled to bus 502 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A device, comprising:
a processor; and
a memory operatively connected to the processor, and including computer code that when executed, causes the processor to:
transmit a short data frame in accordance with a first rate over a channel during a spatial reuse transmit opportunity;
upon successful transmission of the short data frame, transmit one or more subsequent data packets at the first rate or a second rate higher than the first rate during the spatial reuse transmit opportunity or a subsequent spatial reuse transmit opportunity; and
upon unsuccessful transmission of the short data frame, transmit the one or more subsequent data packets at a third rate less than the first rate during the spatial reuse transmission opportunity or a subsequent spatial reuse transmit opportunity, wherein unsuccessful transmission of the short data frame comprises a determination that the short data frame was unacknowledged by a receiving device;
transmit a subsequent short data frame at the third rate;
upon successful transmission of the subsequent short data frame, transmit the one or more subsequent data packets at the third rate during the spatial reuse transmit opportunity or the subsequent spatial reuse transmit opportunity.

2. The device of claim 1, wherein the device comprises one of an access point (AP) or station (STA) belonging to a basic service set (BSS).

3. The device of claim 1, wherein the short data frame is one of a frame having a data length of zero, a frame containing data for at least one symbol, or a frame extending to at least one Media Access Control (MAC) service data unit (MSDU).

4. The device of claim 1, wherein the first rate has a value between minimum and maximum possible rates determined by a traditional algorithm used during non-spatial reuse transmit opportunity.

5. The device of claim 4, wherein the value of the first rate comprises a value midway between the minimum and maximum possible rates.

6. The device of claim 1, wherein successful transmission of the short data frame comprises a determination that the short data frame was acknowledged by a receiving device.

7. The device of claim 1, wherein the first, second, and third rates comprise respective values reflecting an actual bit rate as a function of a modulation and coding scheme value, a number of spatial streams, bandwidth of the channel and a guard interval.

8. The device of claim 1, wherein the first, second, and third rates reflect respective values balancing airtime usage and transmission robustness.

9. The device of claim 8, wherein the computer code, when executed, further causes the implementing at least one of linear and multiplicative incrementing and decrementing of rates to arrive at the first, second, and third rates for the balancing of the airtime usage and transmission robustness.

10. The device of claim 1, wherein the computer code, when executed, further causes the processor to transmit the one or more subsequent data packets at the second rate during the-subsequent spatial reuse transmit opportunity if the spatial reuse transmit opportunity occurred within a threshold of recency.

11. The device of claim 10, wherein the computer code, when executed, further causes the processor to transmit the one or more subsequent data packets at the second rate during the-subsequent spatial reuse transmit opportunity if additionally, data packets transmitted during a previous spatial reuse transmit opportunity are associated with an overlapping basic service set color with which the one or more subsequent data packets are also associated, and one or more stations transmitting data packets in the previous spatial reuse transmit opportunity are to transmit the one or more subsequent data packets.

12. A method, comprising:
  interleaving transmission, from a wireless local area network (WLAN) device, of short data frames using a transmission rate higher than a previously-used transmission rate with spatial reuse data transmissions;
  upon successful transmission of the short data frames, transmitting, by the WLAN device, one or more subsequent data packets at the higher transmission rate during a subsequent spatial reuse transmit opportunity; and
  upon unsuccessful transmission of the short data frames, transmitting, by the WLAN device, the one or more subsequent data packets at previously-used transmission rate during a subsequent spatial reuse transmit opportunity;
  upon further subsequent unsuccessful transmission of the short data frames, transmitting, by the WLAN device, one or more further subsequent data packets at a decreased transmission rate relative to the previously-used transmission rate during a further subsequent spatial reuse transmit opportunity;
  selecting the higher transmission rate and the decreased transmission rate based on desired balancing of airtime usage and transmission robustness.

13. The method of claim 12, wherein the WLAN device comprises one of an access point or station associated to an access point.

14. The method of claim 12, further comprising, upon further subsequent successful transmission of the short data frames, transmitting, by the WLAN device, one or more further subsequent data packets at an increased transmission rate relative to the higher transmission rate during a further subsequent spatial reuse transmit opportunity.

15. The method of claim 12, wherein each of the short data frames is one of a frame having a data length of zero, a frame containing data for at least one symbol, or a frame extending to at least one Media Access Control (MAC) service data unit (MSDU).

* * * * *